Oct. 25, 1960  J. P. WOODS  2,958,048
AUTOMATIC VOLUME CONTROL FOR SEISMOGRAPH SIGNAL AMPLIFIER
Filed June 14, 1957  3 Sheets-Sheet 1

ATTEST
Charles F. Steininger

INVENTOR.
John P. Woods
BY Norbert E. Birch
ATTORNEY

Oct. 25, 1960 J. P. WOODS 2,958,048
AUTOMATIC VOLUME CONTROL FOR SEISMOGRAPH SIGNAL AMPLIFIER
Filed June 14, 1957 3 Sheets-Sheet 2

ATTEST
Charles F. Steininger

INVENTOR.
John P Woods
BY Norleah E. Birch
ATTORNEY

United States Patent Office 2,958,048
Patented Oct. 25, 1960

2,958,048

AUTOMATIC VOLUME CONTROL FOR SEISMO-GRAPH SIGNAL AMPLIFIER

John P. Woods, Dallas, Tex., assignor to The Atlantic Refining Company, Philadelphia, Pa., a corporation of Pennsylvania Filed June 14, 1957, Ser. No. 665,721

4 Claims. (Cl. 330—144)

This invention pertains to seismic exploration and relates more specifically to an automatic volume control for a seismograph signal amplifier.

In seismic prospecting, as it is usually practiced, seismic waves are generated at a shot point near the surface of the earth by detonating an explosive charge placed in a borehole. As the seismic waves travel downwardly through the earth, they are partially refracted and reflected by interfaces between successive geological strata, or other irregularities in the subsurface formations, and returned to the surface of the earth. Various seismic waves reaching different reception points at or near the surface of the earth are detected by seismometers that convert them into corresponding electrical waves. The electrical waves are then amplified electrically and are recorded by means of a multi-element oscillograph, thereby producing a seismogram bearing traces that represent the seismic waves received at the various reception points. Seismic waves which travel from the shot point to the subsurface formations and thence to the various reception points are identified on the seismogram by comparison or correlation methods. The times required for such waves to travel from the shot point to the reception points are employed to determine the depth, nature and structure of the formations. In this way it is possible to locate formations bearing mineral deposits such as petroleum.

Generally speaking, the amplitude of the seismic wave received at the very beginning of a wave train is relatively great. The amplitudes of the early arrivals then increase very rapidly, often attaining a maximum amplitude within as little a time as 0.05 second or less. Thereafter, though the waves fluctuate in amplitude, they are of generally diminishing amplitude and later arrivals are of very low amplitude. Ordinarily, it is desirable to restrict the amplitudes of the recorded traces to about the distance between traces in order that the recorded waves may be readily identified and compared. In order to achieve this result, it is customary to vary the gain of the amplifier through which the waves are passed in such a way as to compensate for large differences in amplitudes of waves in different portions of the seismic wave trains.

Inasmuch as the amplitude of the early arrivals may be as much as one hundred thousand times as great as the amplitude of later arrivals, it is desirable to employ amplifiers that have a high value of maximum gain and a suitable gain control system for varying the gain over a wide range. Two types of gain control systems have heretofore been employed in seismic signal amplifiers. One of these systems is commonly referred to as the time control system, the name being derived from the fact that in such a system the gain of the seismic amplifier is arbitrarily varied as a function of time. Usually this is accomplished by varying the gain of an amplifier as a function of the charging or discharging time of a condenser network. This type of system is open to objection because the particular amplitude pattern of any given seismic signal train is not predictable in advance of generation; and, hence it is impossible to so design a time control system that the time-gain change pattern thereof will provide for optimum recording of the seismic signals.

The second type of gain control system commonly in use is the so-called automatic volume control system. Practically all successful automatic volume control systems have been based on the principle of amplifying the signal in a grid controlled vacuum tube, rectifying part of the amplified signal, and applying the rectified signal, as a biasing potential, to the control grid of the amplifier tube. However, it is well known that controlling the gain of an amplifier in this manner inevitably produces distortion and other attendant disadvantages. Some of these disadvantages result from the reaction of the control signal upon the signal being controlled which, under some circumstances, causes self-oscillation in the amplifier stage or other harmful effects. Other disadvantages result from the fact that, when using a reasonably small number of amplifier tubes, the range of gain control cannot be large without introducing distortion of a nature depending upon the amplification characteristics of the vacuum tubes employed.

It has also been suggested that the control voltage derived from rectifying a portion of the signal should be used to control the effective resistance of attenuator elements shunted across the signal path. This can be done by passing the rectified control voltage directly through the shunting elements, or by using the control voltage to control a second signal, which is substantially higher in frequency than the seismic signal, and passing the second signal through the shunting elements. This type of automatic volume control system has heretofore been characterized by the complexity, unreliability, and expense of the attenuator elements and the circuits employed to couple the control signal to the attenuator elements.

While many of the above described automatic volume control circuits have been, to some extent, successful, none of them to date have been able to provide an output signal which does not vary with the amplitude of the input signal.

Accordingly, the main object of this invention is to provide an automatic system which is capable of controlling the gain of a signal amplifier to such an extent that the output signal remains constant irrespective of changes in the amplitude of the input signal.

Another object of this invention is to provide an automatic system which is capable of controlling the gain of a signal amplifier to such an extent that the output signal varies inversely with changes in the amplitude of the input signal.

A further object of this invention is to provide an improved automatic volume control for a signal amplifier which does not introduce distortion.

Still another object of this invention is to provide an improved automatic volume control for a signal amplifier wherein the control signal has substantially no effect on the signal being controlled.

A still further object of this invention is to provide an improved automatic volume control, of the type having attenuator elements shunted across the signal path, wherein the attenuator elements and the circuits employed for coupling the control signal to the attenuator elements are both simple and inexpensive.

Other objects and advantages of this invention will become apparent from the following description taken in connection with the accompanying drawings.

The preferred form of the instant invention is illustrated in the drawings wherein.

According to this invention there is provided a signal amplifier or transmission system which is provided with at least one signal attenuator element for controlling the amplitude of the signal beyond the point at which the signal for the attenuation control circuit is taken. By this arrangement the output signal from the amplifier or transmission system may be held constant irrespective of changes in the amplitude of the input signal, or the output signal may even be caused to decrease upon an increase in the amplitude of the input signal.

Figure 1:
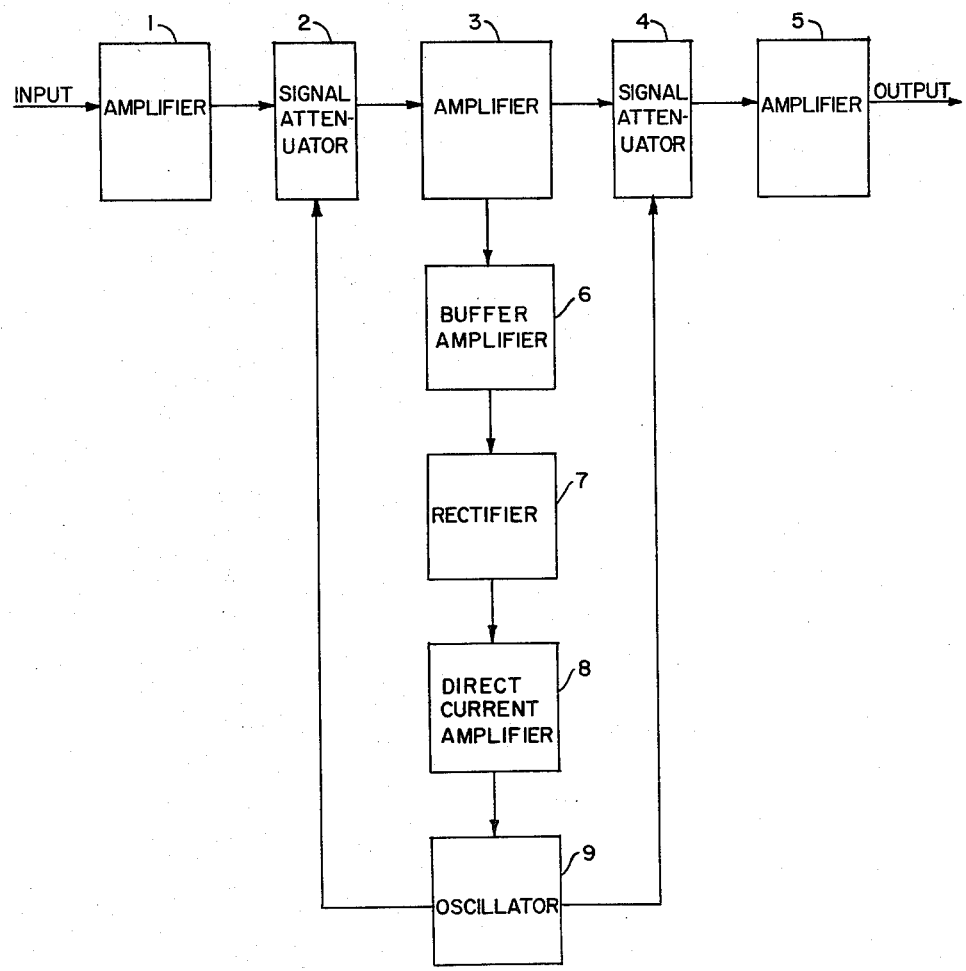
Figure 1 is a block diagram illustrating the principal elements of the present invention.

Referring now to the drawings in detail, a block diagram illustrating a seismic signal amplifier incorporating an automatic volume control circuit in accordance with this invention is shown in Figure 1. An incoming seismic signal, or the like, is first amplified by amplifier stage 1. The output of amplifier stage 1 is coupled to the first signal attenuator element 2 where the signal is attenuated in accordance with an attenuation control current, by shunting a portion of the signal to ground, as will be hereinafter more fully explained. The attenuated signal is then amplified by amplifier stage 3 and again attenuated by signal attenuator element 4 in accordance with an attenuation control current. Amplifier stage 5 is connected in the signal path between signal attenuator element 4 and the output terminals of the amplifier system. If desired, amplifier stages 1, 3, and 5 may be substantially alike and signal attenuator elements 2 and 4 may also be substantially identical. It is preferable that the amplifier stages and signal attenuator elements be designed to accommodate the frequency range of seismic signals which is generally in the range of from 20 to 100 cycles per second.

In order to obtain an attenuation control signal, a portion of the seismic signal passing through the amplifier system is employed. This signal is derived from amplifier stage 3. Buffer amplifier 6 amplifies the attenuation control signal before it passes to rectifier 7, where it is converted into direct current. Direct current amplifier 8 is controlled by the magnitude of the output from rectifier 7, and in turn controls the output of oscillator 9. The frequency of oscillator 9 is preferably in the range of from one hundred thousand to one million cycles per second. Thus, the amplitude of the seismic signal passing through the amplifier system is eventually utilized to control the output of an oscillator which in turn controls signal attenuator elements in the path of the seismic signal both before and after the point where the amplitude of the seismic signal is sampled.

It will be apparent to those skilled in the art that in any automatic gain control system it is desirable that the current or voltage which operates the gain control elements be at a frequency which is different from the input signal and is readily separable from the input signal. It is customary, in radio work and other applications of electronics where relatively high frequencies are used, to control the gain control elements by direct current which is frequently applied to the control grids of the amplifier tubes as a bias. In the present case, since the seismic input signals are of such low frequency, the use of direct current is not convenient. Accordingly, the control current supplied to signal attenuator elements 2 and 4 of the present invention is of a frequency high enough to be easily distinguished and separated from the low frequency seismic input signals.

Figure 2:
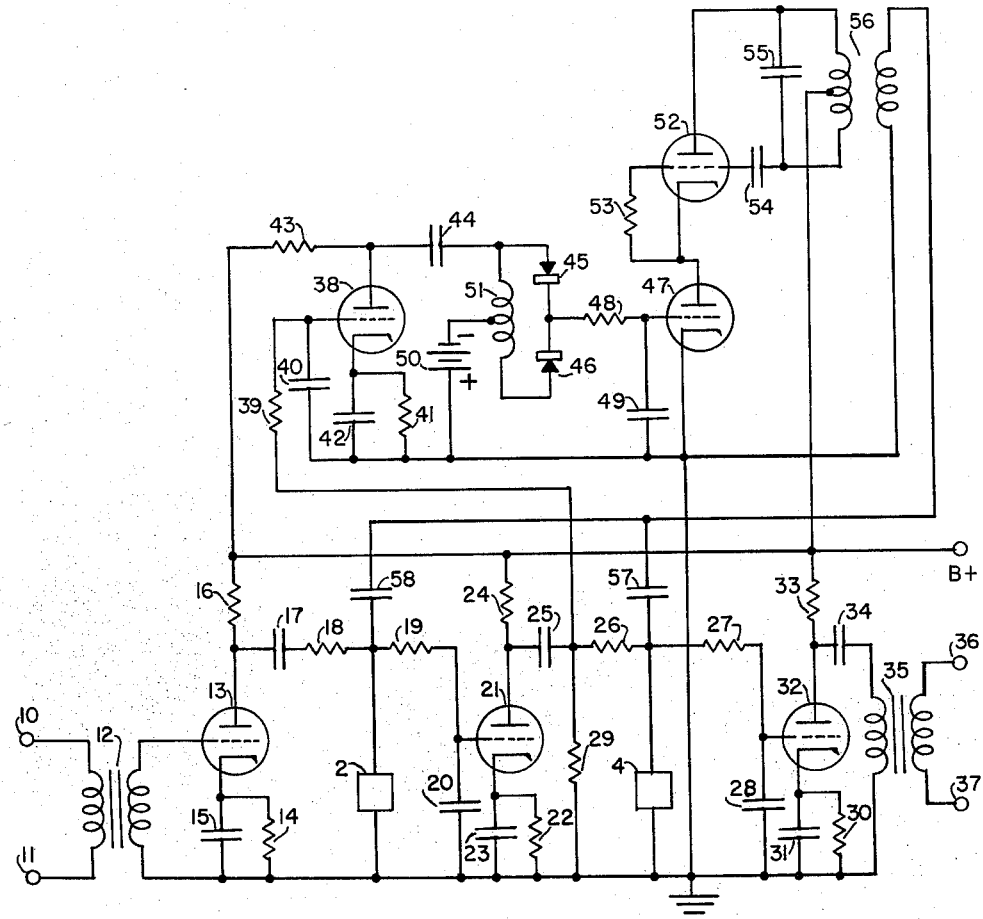
Figure 2 is a simplified schematic circuit diagram of the apparatus generally represented in Figure 1.

The manner in which the functions of the various circuits, denoted by blocks in Figure 1, are achieved can best be seen from Figure 2 which is a simplified schematic circuit diagram showing in detailed form only those elements of the preferred embodiment of this invention which are essential to the purposes of the present invention. In Figure 2, a seismic signal from a geophone or other suitable source is applied across terminals 10 and 11 which lead to the primary of input transformer 12. Transformer 12 may be any acceptable input type transformer with frequency response characteristics suitable for frequencies commonly used in the seismic art. The secondary of transformer 12 is connected between the control grid of vacuum tube 13 and ground. Automatic bias is maintained on tube 13 by cathode bias resistor 14 across which cathode by-pass capacitor 15 is shunted in order to by-pass the alternating current component of the plate current flowing through tube 13. Plate voltage is supplied to tube 13 through plate load resistor 16. These components make up the first stage of the signal amplifier.

The seismic signal, after it has been amplified by the first stage of the signal amplifier, will appear across load resistor 16 as a varying voltage. This voltage is resistance-capacitance coupled to the grid of the vacuum tube in the next amplifier stage. The coupling circuit includes blocking capacitor 17, coupling resistor 18, signal attenuator element 2, grid leak resistor 19, and grid by-pass capacitor 20. Blocking capacitor 17 is used to prevent the high direct current voltage that is present on the plate of tube 13 from being applied to the grid of the next succeeding tube. Coupling resistor 18 is placed in the signal path to form a voltage dividing network with signal attenuator element 2. Since the impedance of signal attenuator element 2 varies in response to an attenuation control current applied to it, it will be apparent to those skilled in the art that the amplitude of the seismic signal present at the junction of coupling resistor 18 and signal attenuator element 2 will also vary in response to the same attenuation control current. Grid leak resistor 19 provides a direct current return path to ground for any electrons which may accumulate on the control grid of vacuum tube 21. This circuit is completed by signal attenuator element 2. Grid by-pass capacitor 20 is provided in order to by-pass any alternating current signals, which have a frequency considerably higher than the seismic signals, to ground and its value should be chosen accordingly. By-pass capacitor 20 is particularly desirable when attenuation control currents of a relatively high frequency are used to operate signal attenuator element 2. Thus, it is obvious that signal attenuator element 2 can effectively control the amplitude of the seismic signal applied to the next amplifier stage by shunting a variable amount of the seismic signal to ground.

The second stage of the seismic signal amplifier includes vacuum tube 21, cathode bias resistor 22, cathode by-pass capacitor 23, and plate load resistor 24. All of these components are connected in substantially the same way and serve substantially the same functions as corresponding components in the preceding amplifier stage.

The second amplifier stage of the seismic signal amplifier is also resistance-capacitance coupled to the third and final amplifier stage in substantially the same manner as the coupling between the first and second amplifier stages. This coupling circuit includes blocking capacitor 25, coupling resistor 26, signal attenuator element 4, grid leak resistor 27, and grid by-pass capacitor 28. Again, all of these components are connected in substantially the same way and serve substantially the same functions as the corresponding components in the preceding coupling circuit. It is to be noted, however, that a portion of the seismic signal at the output of the second amplifier stage is utilized to produce the attenuation control current. This portion of the seismic signal is taken across resistor 29 at the junction of blocking capacitor 25 and coupling resistor 26.

The final amplifier stage of the seismic signal amplifier is similar to the other amplifier stages and includes cathode bias resistor 30, cathode by-pass capacitor 31, vacuum tube 32, and plate load resistor 33. Blocking capacitor 34 connects the primary of output transformer 35 to the amplified seismic signal which will be developed across plate load resistor 33. The secondary output of transformer 35 is, of course, connected to output terminals 36 and 37.

Considering now the attenuation control channel, and in particular the buffer amplifier stage, it will be seen that a portion of the seismic signal which is developed across resistor 29 is applied to the grid of vacuum tube 38 by means of grid leak resistor 39. High frequency components of this signal are by-passed to ground by grid by-pass capacitor 40. In general, the buffer amplifier is similar to the signal amplifier stages and includes vacuum tube 38, cathode bias resistor 41, cathode bias capacitor 42 and plate load resistor 43.

The alternating current component of the voltage developed across plate load resistor 43 is passed by blocking capacitor 44 to diode rectifiers 45 and 46 where it is rectified and impressed upon the grid of vacuum tube 47 as a variable direct current potential by means of grid leak resistor 48. By-pas capacitor 49 is connected between the grid of vacuum 47 and ground, and grid bias is supplied by battery 50 through inductor 51. Thus, vacuum tube 47 is essentially a direct current amplifier; and, since it is connected in series between the cathode of vacuum tube 52 and ground, an increase in the attenuation control signal will cause the grid of vacuum tube 47 to become more positive thereby lowering the effective resistance of vacuum tube 47 and increasing the effective plate voltage on vacuum tube 52. Vacuum tube 52 is part of an oscillator circuit which also includes grid leak resistor 53, grid capacitor 54, tuning capacitor 55 and the primary of transformer 56. Plate voltage is supplied to the oscillator through the center tap in the primary of transformer 56. Values of the components in the oscillator circuit should be selected so that relatively high frequency oscillations will be produced.

High frequency alternating current will be induced in the secondary of transformer 56 by the action of the oscillator; and this current is conducted by leads to capacitors 57 and 58, which are coupled to signal attenuator elements 4 and 2, respectively. Hence, the greater the amplitude of the oscillator output, the more high frequency current will be caused to flow through signal attenuator elements 2 and 4; and their resistance will be lowered accordingly.

Before continuing with a more general discussion of this invention, it is believed that a few comments concerning the signal attenuator elements would be appropriate. These signal attenuator elements may be defined as symmetrical, variable resistors whose resistance is independent of the direction of the applied voltage but is a function of its magnitude. They are manufactured by the Western Electric Company under the trade name, "Varistors," and by the General Electric Company under the trade name, "Thyrite." For convenience they will be referred to by the name Thyrite.

Thyrite resistors are made by pressing specially treated silicon carbide with a ceramic binder into shapes and firing at about 1200° C. After firing and attaching terminals, the rather porous units are impregnated to prevent water absorption.

The conductivity of a mass of Thyrite is uniform in all directions but rises very rapidly with applied voltages. The material may be thought of as an aggregate of resistive granules insulated by films of silicon dioxide. The higher the potential gradient, the larger the number of these gaps that break down and conduct. The insulation reforms immediately after the discharge ceases. The current is thus independent of polarity and frequency of the applied voltage and depends only upon its instantaneous magnitude.

In explaining the operation of the amplifier and attenuation control circuits, it will be assumed that, initially, the input signal is supplied at a constant amplitude. The input signal is amplified by the three stages as hereinbefore described; and, neglecting the effects of the signal attenuator elements 2 and 4, it will be appreciated that the output signal will have an amplitude approximating the amplitude of the input signal multiplied by the product of the gains of the three amplifier stages. If we now assume an increase in the amplitude of the input signal, it will be seen that the effect of this increase, again neglecting the effects of the signal attenuator elements 2 and 4, will be to cause an increase in the amplitude of the outputs of each of the amplifier stages. Considering now the output from the second stage, it will be seen that a portion of the output from this stage taken across resistor 29 is supplied to the grid of the buffer amplifier vacuum tube 38, the output of which is rectified and supplied to the grid of the direct current amplifier vacuum tube 47. The direct current amplifier vacuum tube 47 is in series with the vacuum tube 52 of a relatively high frequency oscillator. By means of a suitable transformer 56 and capacitors 57 and 58, a voltage proportional to the output of the oscillator is applied across signal attenuator elements 2 and 4, which are non-linear resistances, such as Thyrite, that have the property of decreasing in resistance with an increase in current. Now as the amplitude of the output of the second amplifier increases, the output of the buffer amplifier, which is supplied to the rectifier, is likewise increased and the grid of the direct current amplifier vacuum tube 47 is caused to become more positive. When the grid of vacuum tube 47 becomes more positive, the effective resistance of the tube is decreased, thus increasing the effective plate voltage on the oscillator vacuum tube 52 and thereby increasing the amplitude of the oscillator. This increased output from the oscillator results in an increased flow of current, at the oscillator frequency, through signal attenuator elements 2 and 4. The increase in current through signal attenuator elements 2 and 4 lowers the resistance of the elements to all frequencies, including the relatively low frequency of the input signal. Obviously, a decrease in the resistance of signal attenuator elements 2 and 4 tends to decrease the amplitudes of the signals supplied to the second and third amplifier stages.

It will be noted that the signal which is supplied to the attenuation control channel is obtained from the output of the second amplifier stage, and that attenuation control current is supplied not only to a signal attenuator element preceding the second amplifier stage but is also supplied to a signal attenuator element in the input of the third amplifier stage. With this arrangement, by properly selecting the characteristics of signal attenuator element 4, the output from the third stage of the signal amplifier may be held constant irrespective of changes in the amplitude of the input signal; or the output may even be caused to decrease upon an increase in amplitude of the input signal. Moreover, it will be understood that the attenuation control channel may be used to control any number of signal attenuator elements, either in amplifier stages after the point at which the control channel samples the amplitude of the input signal, or in amplifier stages both before and after this point.

Figure 3:
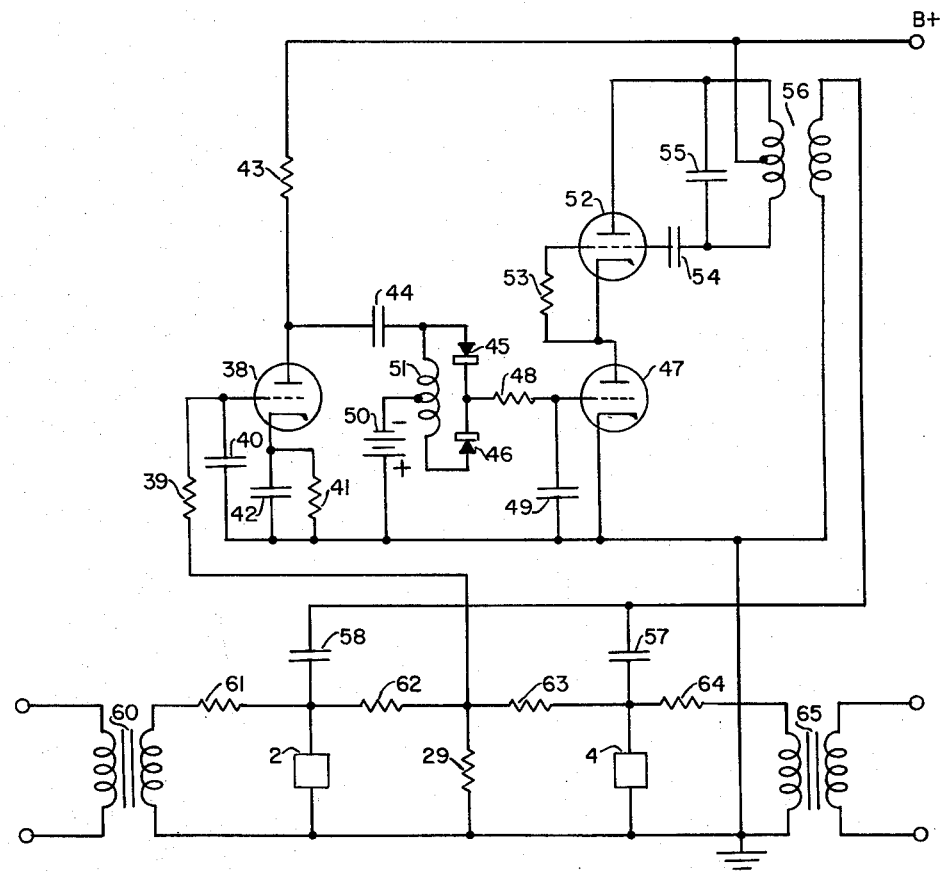
Figure 3 is a simplified schematic circuit diagram showing a transmission system with the present invention incorporated therein.

Further, it will be appreciated that the novel system, including the attenuation control channel and signal attenuator elements, disclosed by the instant invention can be used in conjunction with a signal transmission system as well as a signal amplifier. Figure 3 illustrates such an arrangement. In Figure 3 the transmission system consists of input transformer 60, resistors 61, 62, 63, and 64, and output transformer 65. The components and circuitry of the attenuation control channel and the signal attenuator elements shown in Figure 3 are identical with those shown in Figure 2, which have heretofore been explained.

Briefly explained, an input seismic signal, or the like, may be impressed across the primary of input transformer 60, where it will induce a similar signal in the secondary of transformer 60. After passing through resistors 61, 62, 63, and 64, this signal will be supplied to output transformer 65. Voltage which is developed across resistor 29 is applied to the grid of the buffer amplifier vacuum tube 38, the output of which is eventually utilized to control the output of a relatively high frequency oscillator, as hereinbefore explained. Likewise, the output of this oscillator is employed to lower the resistance of signal attenuator elements 2 and 4. Thus, by properly selecting the characteristics of the signal attenuator elements, a transmission system may be provided wherein the amplitude of the output level will never go above a given value irrespective of changes in the amplitude of the input signal, or the output may even be caused to decrease upon an increase in the input signal.

Having thus described my invention, it is to be understood that such description has been given by way of illustration and example only and not by way of limitation, reference for the latter purpose being had to the appended claims.

I claim:

1. In an approved amplifier and automatic gain control circuit designed for use with seismic recording equipment the improvement comprising three series connected audio amplifiers, each of said amplifiers including a cathode, a grid and a plate, and an intermediate and last of said amplifiers including grid leak resistors, two Thyrite resistors, a first of said Thyrite resistors being connected in parallel with said intermediate audio amplifier grid leak resistor and the second of said Thyrite resistors being connected in parallel with said last audio amplifier grid leak resistor, a buffer amplifier connected to the plate of said intermediate audio amplifier, a rectifier connected to the output of said buffer amplifier, a direct current amplifier connected to the output of said rectifier, a high frequency oscillator connected to the output of said direct current amplifier whereby said direct current amplifier output signal amplitude modulates the output signal of said oscillator, and the output of said oscillator connected in parallel to said two Thyrite resistors whereby seismic signal amplitude variations on the grid of said second audio amplifier determine the resistance of said Thyrite resistors and the gain of said intermediate and last audio amplifiers.

2. In combination a seismograph amplifying circuit having three series connected audio amplifiers and means to automatically adjust the gain of the intermediate and last amplifiers, said means comprising two Thyrite signal attenuator elements, the first Thyrite element connected across the input of said intermediate amplifier, the second Tryrite element connected across the input of said last amplifier, a buffer amplifier connected to the output of said intermediate amplifier, a rectifier connected to said buffer amplifier, a direct current amplifier connected to said rectifier, a high frequency oscillator connected to said direct current amplifier in such a manner that said oscillator output is amplitude modulated by variations of said intermediate amplifier output, a center-tapped transformer coupled between said Thyrite elements and said oscillator ion such a manner that the amplitude modulated signal is applied to said Thyrite elements whereby said intermediate and last amplifier gains are adjusted in accordance with the seismic signal amplitude variations appearing at said intermediate amplifier.

3. A method of automatically controlling the gain of two of three series connected seismic signal amplifiers, the intermediate and last amplifiers containing variable impedance components in their input circuits comprising the steps of taking a portion of a seismic signal from the output of an intermediate amplifier, amplifying and rectifying said portion, using said portion to amplitude modulate a high frequency current, applying the resulting high frequency amplitude modulated current to said variable impedances, whereby the gain of said intermediate amplifier and said last amplifier are affected as a function of the amplitude of said amplitude modulated high frequency current.

4. A method of automatically controlling the gain of a plurality of series connected seismic signal amplifiers, an intermediate amplifier and at least a succeeding amplifier each containing a variable impedance component in its input circuit, comprising the steps of amplifying low frequency seismic signals in at least three amplifiers, taking a portion of said low frequency seismic signals from an output of said intermediate amplifier, amplifying and rectifying said portion, converting said portion to a high frequency current whose amplitude is modulated by the amplitude variation of said seismic signal at said intermediate amplifier, applying the resultant high frequency amplitude modulated current rearward and forward of said intermediate amplifier to said variable impedance components, and varying the gain of amplifiers following a first amplifier by causing the impedances of said impedance components to vary as a function of the amplitude of said high frequency amplitude modulated current.

References Cited in the file of this patent

UNITED STATES PATENTS

| | | |
|---|---|---|
| 1,905,946 | Mathieu et al. | Apr. 25, 1933 |
| 2,087,316 | Doba | July 20, 1937 |
| 2,112,279 | Hagenhaus | Mar. 29, 1938 |
| 2,279,128 | Paslay | Apr. 7, 1942 |
| 2,411,903 | Slonczewski | Dec. 3, 1946 |
| 2,538,772 | Ferrill | Jan. 23, 1951 |
| 2,547,703 | Hermont et al. | Apr. 3, 1951 |
| 2,600,051 | Fay et al. | June 10, 1952 |